Sept. 21, 1965     A. SCHECHTER     3,207,415

HEAT SEALING CONTAINERS

Filed Aug. 14, 1961     2 Sheets-Sheet 1

INVENTOR.
ALFRED SCHECHTER

BY *Hudson & Young*

ATTORNEYS

Sept. 21, 1965     A. SCHECHTER     3,207,415
HEAT SEALING CONTAINERS
Filed Aug. 14, 1961     2 Sheets-Sheet 2

INVENTOR.
ALFRED SCHECHTER
BY
ATTORNEYS

United States Patent Office 3,207,415
Patented Sept. 21, 1965

3,207,415
HEAT SEALING CONTAINERS
Alfred Schechter, Orangeburg, N.Y., assignor, by mesne assignments, to Phillips Petroleum Company, a corporation of Delaware
Filed Aug. 14, 1961, Ser. No. 131,341
11 Claims. (Cl. 229—43)

This invention relates to sealing open containers. In one aspect it relates to a method for sealing a container having a projecting lip by sealing a cover to a sealing strip through openings in the lip. In another aspect the invention relates to means for applying a cover to a container having a projecting lip and sealing it to a sealing strip through openings in the lip. In another aspect this invention relates to a sealed package comprising an open top container with a peripheral lip having open portions, and a cover sealed through the open portion to a sealing strip.

Sealed containers have found many uses in the packaging industry including the packaging of food. One widely used package form comprises a thermoplastic container closed by a thermoplastic cover sheet which is fused directly to the container. Such packages have broad utility in many applications, supplying an economical, attractive and durable unit. However, in some instances, contamination of the container lip to which the cover sheet is sealed, as for example, during the filling operation, interferes with proper heat sealing, at times resulting in excessive package rejection.

It is also desirable to place heat sealable covers on containers which either will not bond at all to the material of the container or which will form a seal, but without sufficient strength to withstand handling in transportation, storage and display for sale, or to utilize an adhesive for sealing the cover, which adhesive does not adhere to the container.

An object of this invention is to provide a novel sealed package.

Another object of this invention is to provide a method for sealing a container.

Another object of this invention is to provide means for forming sealed packages.

Another object of this invention is to provide a novel boilable container.

Other aspects, objects and advantages of my invention are apparent in the written description, the drawing and the claims.

According to my invention there is provided a method for sealing containers having a peripheral projecting lip by forming openings in the lip and sealing a cover through these openings to a sealing strip beneath the lip. The sealing strip can be a separate strip of material to which the cover is sealable or can be formed of a projecting portion of the cover itself which is folded under the lip. In many instances it is desirable to seal the strip to the underside of the lip as well as to the cover through the openings. I have found also that a desirable method for making sealed packages includes the steps of forming an open container with a peripheral projecting lip, placing a commodity to be packaged into the container, subsequently forming openings in the lip, placing a cover over the container and sealing the cover through the openings to a strip beneath the lip. In this method also it is desirable in some instances to seal the strip to the underside of the container lip. The cover can be sealable to the sealing strip by being heat sealable thereto or by the use of a suitable adhesive.

Also according to my invention there are provided means for sealing a container having a peripheral projecting lip with openings therein including means for placing a sealable cover over the container, means for placing a sealing strip under the lip, and means for sealing the cover to the strip through the openings. In one embodiment, the sealing means includes means for folding the cover under the lip, thus forming the sealing strip from a projecting portion of the cover. My invention also includes means for sealing a container including means for filling the container, means for subsequently providing openings in a projecting lip of the container and means for placing a cover over the container, a sealing strip under the lip, and means for sealing the cover to the strip.

Further, according to my invention, there is provided a package comprising an open top container, a peripheral lip on the container having openings therein, and a cover sealed through these openings to a sealing strip beneath the lip. In one embodiment, the sealing strip is separate from the cover, while in another embodiment the strip comprises an extended portion of the cover folded under the lip. My invention also contemplates such a package in which the sealing strip is itself sealed to the underside of the lip, as well as to the cover through the openings.

Figure 2:
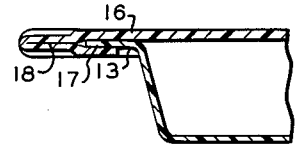
FIGURE 2 is a cross-section taken along the line 2—2 of FIGURE 1.
Figure 1:
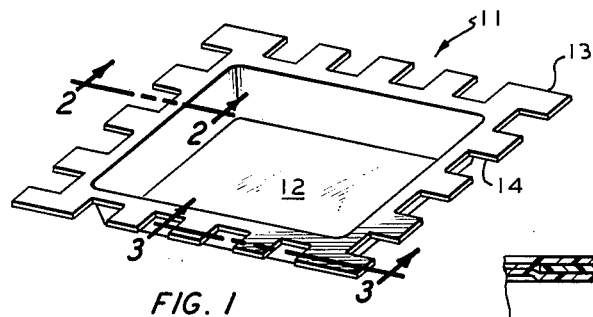
FIGURE 1 is a diametric view of a package according to my invention.
Figure 3:
FIGURE 3 is a cross-section taken along the line 3—3 of FIGURE 1.

In FIGURE 1, the container 11 comprises a chamber 12 and a projecting lip 13. Lip 13 extends outwardly from chamber 12 on all sides thereof forming a continuous projection, having a plurality of openings 14 extending to the edge thereof. When a heat sealed package is formed from the container of FIGURE 1, a sheet of heat sealable film, extending outwardly from lip 13 on all sides, is folded under the lip and heat applied to seal the material to the underside of lip 13 and, through openings 14, to itself. This is illustrated in FIGURE 2 wherein the cover sheet 16 is folded under lip 13 and sealed thereto at the surface 17 and to itself along surface 18. If the corners of sheet 16 are cut out prior to folding under, the seal can be formed with substantially no overlap of the cover or with a desired amount of overlap. A very effective seal can be provided by leaving the cover intact prior to folding under, but additional heat or time must be applied to complete the seal of the extra layer of underneath portion. A heat sealed package can also be formed using the container of FIGURE 1 by placing separate sealing strips under lip 13 and causing the cover to be sealed to the strips through openings 14. The strips also can be sealed to the underside of lip 13.

Figure 4:
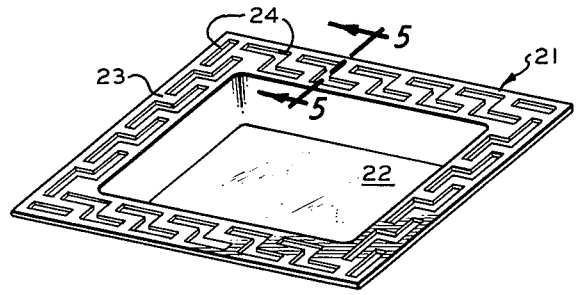
FIGURE 4 is a plan view of a package according to my invention in which the openings overlap horizontally and laterally in the plane of the cover.
Figure 5:
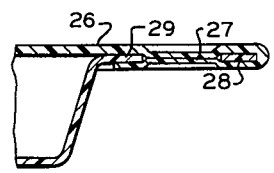
FIGURE 5 is a cross-section on the line 5—5 of FIGURE 4.

FIGURE 4 illustrates a container in which the openings are formed entirely within the projecting lip and overlap both laterally and horizontally. In this figure, container 21 includes chamber 22 and projecting lip 23. Lip 23 is provided with openings 24 which are formed so that there is no direct path in the plane of the lip from chamber 22 to the outside. The seal is formed in the same manner as described with respect to FIGURE 1, but the completed seal comprises the portions in the holes 24 which are overlapped so that there is no direct path to the atmosphere from the inside of the chamber. The completed seal is illustrated in FIGURE 5 which shows that cover sheet 26 is folded under and sealed to itself along surface 27 at the opening 24. Cover sheet 26 also touches surfaces 28 and 29 of the lip and, in some instances, is sealed thereto. The configuration of FIGURE 4 is particularly useful in those instances in which it is impossible or difficult to obtain a satisfactory seal between the material of the cover and the material of the lip. For example, in some instances it is desirable to form the container of a metal such as aluminum so that the container, which contains frozen food for example, can be placed in direct contact with a flame for heating at very high temperatures. In this instance, although a seal can be formed between a thermoplastic cover sheet, such as for example polyethylene, some difficulties are encountered in obtaining a high strength bond between the polyethylene and the aluminum. The seal of the polyethylene to itself through the holes 24 provides the necessary strength while the seal between the polyethylene and the aluminum between the holes maintains a seal and this portion of the seal is not relied upon for strength nor subjected to forces which could break it. Where an absolutely air tight seal is not required, a configuration similar to that illustrated in FIGURE 4 is useful also in that the seal is provided primarily by the portion of the cover which is sealed to the sealing strip through the holes, thus providing a tortuous path through the unsealed portion resulting in very good control of a product such as, for example, a granular material.

Figure 6:
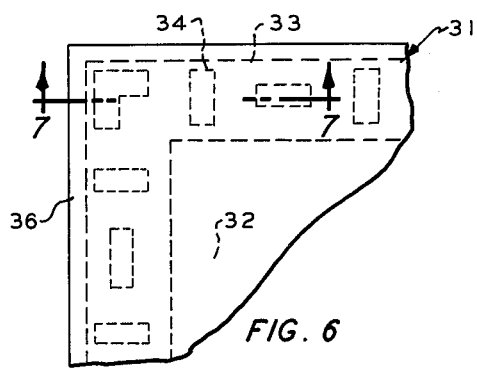
FIGURE 6 is a fragmentary plan view of a completed package in which the cover is a separate piece from the sealing strip under the lip.
Figure 7:
FIGURE 7 is a cross-section along the line 7—7 of FIGURE 6.

FIGURE 6 illustrates a heat sealed package in which the cover sheet and the sealing strip are separate but in which both overlap the edge of the lip slightly and are sealed together. This performs the function of providing a continuous sealed edge although the seal is formed from two separate pieces. In this embodiment, the container 31 comprises chamber 32 and projecting lip 33 having openings 34. A cover sheet 36 is placed over the container extending over lip 13 and a short distance beyond. While sealing strip 37, which is placed under lip 33, can be made in two or more sections to facilitate installation, it can be made of a single strip placed on the package from below. Cover sheet 36 and sealing strip 37 are sealed together by heat along the surfaces 38, 39, 40, etc., to complete the seal.

Figure 8:
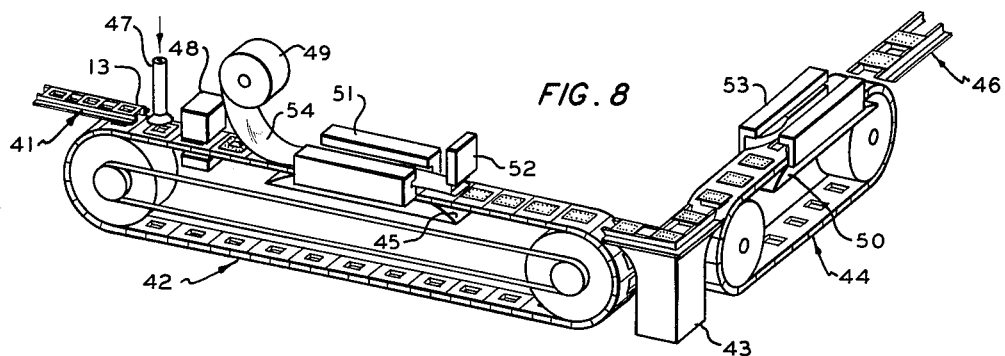
FIGURE 8 is a schematic representation of apparatus for the formation of heat sealed packages.

FIGURE 8 illustrates diagrammatically suitable apparatus for heat sealing packages according to my invention. This apparatus comprises a delivery conveyor 41, a first sealing conveyor 42, a 90° corner conveyor 43, a second sealing conveyor 44 and a package removal conveyor 46. Associated with conveyor 42 are a filling means 47, a die cutter 48, film feeding roll 49, film turning and sealing means 51 and cutter 52. Associated with conveyor 44 are film turning and sealing means 53. Package lifting surfaces 45 and 50 are provided for conveyors 42 and 44 respectively to engage the bottoms of the packages and lift them into position so that the outside lips enter film turning and sealing means 51 and 53.

Figure 9:
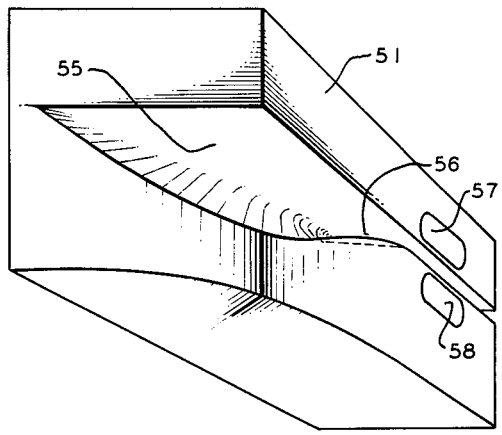
FIGURE 9 illustrates the turning and sealing means of FIGURE 8.

FIGURE 9 illustrates schematically one type of turning and sealing means 51. This element includes a surface 55 which engages the upper surface of the film 54 and as each package and its corresponding portion of cover film pass through the element, the overhanging edge of the film is gradually turned downward and under the lip of the package until, as it enters the slot 56, the film is wrapped completely under the lip. Heating elements 57 and 58 are provided as shown on either side of slot 56 to supply sealing heat to the package.

In operation, a suitable container, for example, the container illustrated in FIGURE 1, is transported by conveyor 41 and delivered to conveyor 42. The container then passes under filling means 47 where it receives a measured quantity of the desired commodity and then is transported to die cutter 48 which cuts the openings 14 in lip 13. The container is then carried farther toward turning and sealing means 51, where cover film 54 comes into contact with the upper surface. Film 54 is wider than container 11 and extends beyond the outer edge of lip 13 on each side in an amount equal to the desired length of the turned under portion. As the container with the film in place on its upper surface passes through turning and sealing means 51, the film is contacted by surface 55 and corresponding surfaces, which gradually turns the film downward and then under, guiding it into the slot 56 and corresponding slots where heat is supplied to the film by sliding contact to form the seal. Conveyor 42 carries the sealed package forward and it is this motion which feeds the film from roll 49. Of course, suitable positive feeding means can be provided where necessary or desirable. The partially sealed package then passes under automatic knife 52 which cuts the film transversely leaving an overhanging portion beyond the outer edge of the forward and trailing transverse edges of lip 13. The package then is delivered to conveyor 43 which passes the package to conveyor 44 without, however, turning the package so that conveyor 44 presents the unsealed edges to film turning and sealing means 53 which are substantially the same as means 51 associated with conveyor 42. In this manner, the remaining unsealed edges are turned and sealed and the completely sealed package is delivered to package removal conveyor 46. Details of these various feeding, cutting, turning and sealing means are not shown since they, as well as the conveying means, are available individually for forming the combination of my invention.

Although the openings in the container lip can be formed at the time the lip is formed or prior to the time the lip is formed, there are advantages in many instances in cutting these openings after the filling operation. For example, when a material is fed to the container, for example, ice cream, which tends to contaminate the upper surface of the lip 13, if the openings are made prior to filling, there is a possibility also of contamination of the lower surface through the openings. On the other hand, if the openings are formed after the filling operation, the continuous lip protects the undersurface thereof during the filling operation and an uncontaminated lower surface is presented to the sealing film. Unless otherwise specified, it is contemplated that my invention can be practiced by forming the openings prior to, coincident with, or subsequent to the formation of the container including the lip. However, the formation of the openings subsequent to the filling operation is a special feature of my invention.

Material suitable for use as the sealing cover and sealing strip include broadly, heat sealable materials. Of particular utility in practicing my invention are thermoplastic materials and laminates of thermoplastic films. For example, polyethylene is especially well suited for the sealing material both for use with polyethylene containers and with containers of other material either heat sealable or non-heat sealable. When it is desired to form a package of aluminum, my invention can be practiced by using an aluminum container and a cover and sealing strip of a polyethylene-aluminum laminate, the polyethylene sealing to itself through the openings in the lip, as well as to the underside of the lip itself.

In all of the embodiments of my invention, a sealable cover is bonded to a sealing strip through openings in the container lip. As pointed out above, in some instances the strip is a separate piece where in other instances this strip is formed by turning under a portion of the cover itself.

My invention is particularly useful in that dissimilar materials can be used in the base (container) and the cover. As noted above, a valuable use is in the production of packages having an aluminum body and a heat sealable thermoplastic cover. The ability to provide a satisfactory seal utilizing dissimilar materials which will not adhere to each other greatly extends the usefulness of heat sealing in the package industry.

My invention also facilitates the use of cover materials which cannot be heat sealed. Through the use of a suitable adhesive, a cover can be sealed to itself or to a separate sealing strip through the openings in the projecting lip of the container. For example, a plain paper board top can be used with a plastic container. When this is done it is advantageous to use an adhesive which adheres to the cover only and not to the material of the container. In this way, when the cover is stripped away, a reusable container is obtained, uncontaminated or disfigured by pieces of the cover sticking to it. To make even more certain that the upper surface of the container is uncontaminated, adhesive can be applied only to the sealing strip which contacts the under surface of the sealing lip, whether such sealing strip is a separate strip of material or a turned under portion of the cover itself.

The use of my invention also makes possible the formation of a container having sufficient rigidity for transportation and storage without using excessively thick material for the container or cover. For example, a light weight plastic container can be used in combination with a paper board top, the turned under portion of the cover, heat sealed or adhesive sealed, providing reinforcement at very low cost.

The embodiment of FIGURE 4 in which a tortuous path is provided between the inside of the container and the atmosphere is very useful in the field of boilable containers. With such containers it is desirable to prevent contamination or leakage of the contents during processing, transportation and storage, but to permit the escape of vapors while the package is being heated. This is desirable to prevent swelling of the package by the accumulated vapors and the consequent insulating effect resulting in long heating time. By sealing the cover to a sealing strip through openings cut in the projecting lip, very close control of the size and shape of the tortuous path is obtained. Further, when the relationship between the materials of the package and cover is such that a relatively weak seal is formed between the two, and this weak seal is reinforced by the strong seal made through the openings, in the projecting lip, the seal can be relied upon to prevent contamination or leakage of the package product but will open under the pressure exerted by the expanding vapors to permit escape of these vapors. A particularly advantageous combination for many uses comprises an aluminum container with a polyethylene coated film of polyethylene terephthalate resin such as the commercially available film Mylar polyester resin or a polyethylene coated metal foil top.

Reasonable variation and modification are possible within the scope of my invention which sets forth a novel sealed container in which a sealable cover is bonded to a sealing strip through openings in the container rim, and method and apparatus for the formation of such a package.

I claim:

1. A method for making sealed packages which comprises the steps of forming an open container having a peripheral projecting lip, placing a commodity to be packaged into said container, subsequently forming openings in said lip, placing over said container a cover, placing a sealing strip under said lip, and sealing said cover to said strip through said openings.

2. A method for making heat sealable packages which comprises the steps of forming an open container having a peripheral projecting lip, placing a commodity to be packaged into said container, subsequently forming openings in said lip, placing over said container a cover made of heat sealable material, placing a sealing strip of said heat sealable material under said lip, and applying heat to said material at said lip to seal said cover to said strip through said openings.

3. A method for making heat sealed packages which comprises the steps of forming an open container having a peripheral projecting lip, placing a commodity to be packaged into said container, subsequently forming openings in said lip, placing over said container a thermoplastic cover, placing a sealing strip of said thermoplastic material under said lip, and applying heat to said material at said lip to seal said cover to said strip through said openings.

4. A package comprising an open top container holding a product, a peripheral lip on said container having openings therein, said container, including said lip, having sufficient stiffness to be self supporting and substantially retain its formed configuration said openings overlapping longitudinally and laterally, a cover extending over said container including said lip, and a sealing strip under said lip sealed to said cover through said openings.

5. A package comprising an open top container holding a product, a peripheral lip on said container having openings therein, said container, including said lip, having sufficient stiffness to be self supporting and substantially retain its formed configuration said openings defining at least one tortuous path along the surface of said lip, a cover extending over said container including said lip, the material of said cover being dissimilar to the material of said container, and a sealing strip under said lip sealed to said cover through said openings.

6. A package comprising an open top aluminum container holding a product, a peripheral lip on said container having openings therein, said container, including said lip, having sufficient stiffness to be self supporting and substantially retain its formed configuration said openings defining at least one tortuous path along the surface of said lip, a laminated cover extending over said container including said lip, the layer of said cover in contact with said lip being polyethylene, and a sealing strip under said lip sealed to said cover through said openings.

7. Means for sealing a container having a peripheral projecting lip, comprising means for placing a product into said container, means to form openings in said lip of said container holding said product, means for placing over said container including said lip a heat sealable cover, means for placing under said lip a sealing strip of heat sealable material, and means for applying heat to said cover and said strip at said lip to seal said cover to said strip through said openings.

8. Means for heat sealing a container having a peripheral projecting lip, comprising means for placing a product into said container, means for forming openings in said lip of said container holding said product, means for placing over said container a heat sealable cover extending beyond said lip, means for folding said cover under said lip, and means for applying heat to said folded cover on said lip to seal said cover to itself through said openings.

9. A package comprising an open top container holding a product, said container having a bottom portion, an upstarting peripheral side wall extending from said bottom portion and terminating at the top thereof with an outwardly projecting lip, said side wall forming an open mouth around which said lip extends and said lip having openings therein, all portions of said lip being substantially in a single plane extending across said open mouth, said container, including said lip having sufficient stiffness to be self supporting and substantially retain its formed configuration, a cover extending over said open mouth of said container and over said lip, said cover thereby forming a top portion of said package, and a sealing strip under said lip, sealed to said cover through said openings.

10. A package according to claim 9 wherein said sealing strip comprises an extension of said cover extending over said container around said lip.

11. A package according to claim 9 wherein said openings extend to the outer edge of said lip.

References Cited by the Examiner

UNITED STATES PATENTS

| | | |
|---|---|---|
| 1,597,677 | 8/26 | Everett. |
| 2,674,536 | 4/54 | Fisher. |
| 2,715,089 | 8/55 | Michener. |
| 2,759,656 | 8/56 | Abrams. |
| 2,899,347 | 8/59 | Kindseth. |

FOREIGN PATENTS 810,133  3/59  Great Britain.

GEORGE O. RALSTON, *Primary Examiner.*

EARLE J. DRUMMOND, FRANKLIN T. GARRETT, *Examiners.*